United States Patent [19]

Narusawa et al.

[11] 3,791,545
[45] Feb. 12, 1974

[54] MOISTURE-PROOF SEAL FOR CONTAINERS

[75] Inventors: Shozo Narusawa; Norit Oshi Iizuka; Jiro Kawasaki, all of Tokyo, Japan

[73] Assignee: Yurin Tokushu Kogyo Co., Ltd., Tokyo, Japan

[22] Filed: Oct. 5, 1971

[21] Appl. No.: 186,378

Related U.S. Application Data

[63] Continuation-in-part of Ser. No. 789,144, Jan. 6, 1969, abandoned.

[52] U.S. Cl......215/274, 215/232, 215/323, 215/341
[51] Int. Cl........................ B65d 23/00, B65d 53/00
[58] Field of Search............................ 215/40, 37, 38

[56] References Cited
UNITED STATES PATENTS

| | | | |
|---|---|---|---|
| 3,192,091 | 6/1965 | Hey et al. | 156/247 |
| 3,367,909 | 2/1968 | Gilsonia | 260/45.95 |
| 3,341,626 | 9/1967 | Peterkin | 260/897 |
| 3,501,042 | 3/1970 | Risch et al. | 215/40 |
| 3,516,565 | 6/1970 | Hatkevich | 215/40 |
| 3,330,720 | 7/1967 | Stevens et al. | 161/162 |
| 3,463,339 | 8/1969 | McGuckin | 215/38 |

*Primary Examiner*—George T. Hall
*Attorney, Agent, or Firm*—Toren and McGeady

[57] ABSTRACT

By first applying, either to the entire top peripheral surface of the mouth of a container or to the underside of its cap member, a packing material having the properties that it will not undergo plastic deformation when subjected to a compression force of the order of 1 kg/cm$^2$ but will exhibit plastic flow when subjected to a compression force of about 2 kg/cm$^2$ or more and that it exhibits adhesiveness, air-tightness, waterproofness, non-toxicity and resistance to chemicals at normal temperature, and thereafter applying a pressure of about 2 kg/cm$^2$ or more to said packing material through the cap member, an ideal moisture-proof sealing which also permits the contents to be held under reduced pressure in the container is obtained for such contents as will be liable to being spoiled upon their exposure to heat and/or moisture.

3 Claims, 1 Drawing Figure

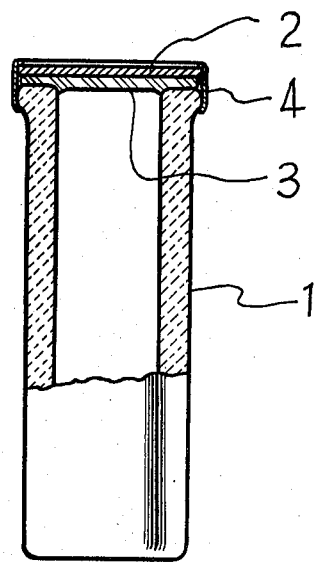

MOISTURE-PROOF SEAL FOR CONTAINERS

This is a continuation-in-part application of U.S. Pat. application Ser. No. 789,144 filed Jan. 6, 1969, now abandoned.

BACKGROUND OF THE INVENTION

1. Field of the Invention

The present invention concerns a seal for the mouths of containers such as glass bottles, and more particularly, it relates to a method of producing perfect moisture-proof seals at the top peripheral edges of the mouths of containers in which are contained such substances as are liable to be spoiled when exposed to heat and/or moisture.

2. Description of the Prior Art:

Drugs and medical or chemical reagents are contained, in general, in either ampoules or glass bottles. In the past, such contents were protected from the ambient moisture and/or kept under reduced pressure in the containers by sealing the mouths or the spouts through which the contents were to be disposed or discharged from the containers. In the case of ampoules, the sealing was produced by melt-fusing the end portions thereof. Where the containers were glass bottles, the sealing of their mouths was performed by the application of rubber stoppers to the mouths.

However, the sealing of the end portions of ampoules which was performed by relying on the melt-fusing technique was never efficient from the industrial point of view, and moreover such a sealing necessarily involved the heating of the end portions of the ampoules. This heating of the end portions of ampoules, however, was not only inappropriate for but also detrimental to such contents as the drugs or medicines containing antibiotic substances or vaccines, since the heat from melt-fusing could be fatal to these contents. On the other hand, in case the mouth portions of glass bottles were sealed by the insertion of rubber stoppers into the neck portions of the bottles, there was encountered the inconvenience that, owing to the lack of uniformity in the diameter of the bottles due to manufacturing errors (usually such error was in the order of ±0.3 mm for the inner diameter of 10 mm), there have been experienced a wide range of easiness and difficulty in the accomplishment of the insertion. Thus, there were instances where it was completely impossible for one to seal the mouths of bottles, or to apply cover members thereto, or where the stoppers or the cover members did not snugly fit into or onto the neck of the bottles so that the resulting containers proved to be unsuitable for the purpose of keeping the contents from ambient moisture or for the purpose of preserving the contents under reduced pressure.

In order to eliminate or dissipate such drawbacks of the prior art, there has been proposed a seal for providing a protecting flange around either the top edge of the rubber stopper or the top peripheral edge of the mouth of the glass bottle. However, because the area of contact between the lower or upper horizontal surface of such a flange which is provided on either the stopper or the mouth of the bottle and the surface opposing thereto of the mouth of the bottle or the stopper is limited considerably in general, it often occurred that the interior of the bottle was allowed to communicate with the ambient air through fine cracks or ruptures which were produced in the external surface of the stopper when the latter was forced into the neck portions of the bottle, causing the contents to be undesirably subjected to the ambient moisture or to the atmospheric pressure. Thus, the resulting capped or sealed bottle was no longer useful or suitable for the purpose of preserving the contents under reduced pressure continuously for an extended period of time without exposing the contents to the ambient moisture. Moreover, such a sealing arrangement as in the prior art led to a complicated sealing mechanism and this, in turn, was disadvantageous in that the manufacturing cost of the entire bottle assembly for use as a container of the aforesaid substances would accordingly become high.

There has been proposed also a method which utilized an adhesive. Such a device, however, was susceptible to the danger that the drug solution contained in the bottle could be contaminated by the solvent employed for the adhesive, and afforded the inconvenience that when the mouth of the bottle was to be sealed by a cap or a stopper, it was necessary that the cap or the stopper be held, continuously for a considerably extended period of time, in the state of being in pressure contact with the upper peripheral edge of the mouth of the bottle until the adhesive dried, i.e., until it became solidified and settled thereto. Thus, it was impossible for one to expect, from this prior method, a sufficient effect in keeping the contents under a reduced pressure and/or under a continuous desirable moisture-proof condition.

SUMMARY OF THE INVENTION

It is, therefore, the object of the present invention to eliminate the foregoing drawbacks of the moisture-proof and reduced pressure preserving sealing method of the prior art, and to provide an improved seal for bottles and like containers for drugs, chemical reagents and medical reagents, which is capable of preserving the contents under a reduced pressure and/or in a moisture-proof condition for an extended period of time.

More specifically, according to the present invention, there is provided an improved seal for bottles or the like which is capable of preserving the contents under a reduced pressure and/or in a desirable moisture-proof condition by first applying a packing material onto, for example, the entire top peripheral edge portion of the bottle containing therein desired substances to be packed, said packing material being of the properties that it will not undergo plastic deformation when subjected to a compression force of the order of 1 $kg/cm^2$ but will exhibit plastic flow upon being subjected to a compression force of about 2 $kg/cm^2$ or more and that it exhibits adhesiveness, air-tightness, water-proofness, resistance to chemicals and non-toxicity, and thereafter applying a cap member onto said packing material and pressing said cap member against the packing material lying beneath thereof, in such a way that the packing material which is sandwiched between the cap member and the top peripheral surface of the mouth of the bottle is subjected to a compression force of from about 2 $kg/cm^2$ to 30 $kg/cm^2$ either under atmospheric pressure or under a reduced atmospheric pressure, as required, so that as a result the cap member is forced into pressure contact with the top peripheral edge of the bottle with the intervention of the packing material therebetween.

The accompanying drawing shows a longitudinal sectional view of the bottle and the cap member which are in the state that said bottle is sealed according to the method of the present invention.

In the drawing, reference numeral 1 represents a neck portion of a bottle or ike container, said neck portion including the top peripheral edge portion and the cylindrical side wall portion of the neck of the bottle, 2 represents a cap plate which is placed on said top peripheral surface of the neck portion of the bottle. Said cap plate may be made with a metal plate, rubber plate or like plate, as desired, but it should have a thickness sufficient for retaining the contents of the bottle in a moisture-proof condition and/or under reduced pressure.

In the illustrated embodiment, there is placed - between said cap plate and the top peripheral surface of the mouth of the bottle - a packing material 3 which is of the properties that it will easily exhibit plastic flow when subjected to a compression force of about 2 kg/cm² but will not exhibit any appreciable plastic deformation at all when subjected to a compression force of the order of 1 kg/cm² and that it is rich in adhesiveness, air-tightness, water-proofness, resistance to chemicals and also in non-toxicity.

This packing material 3 is required to have a thickness sufficient for filling up the fine irregularities and undulations which are present in both the top peripheral surface of the mouth of the bottle and the under-surface of the cap member with which the packing materials is brought into contact and also sufficient for allowing said packing material 3 to extend through the entire peripheral edges of both the top of the bottle neck and the under-side of the cap member. Usually, the packing material 3 which is applied to or adheres to the top surface of the mouth of bottle or the under-side of the cap member is of a thickness of the order of 0.1 mm.

In order to put the seal of the present invention into practice by the use of a bottle and a cap member which is of a size suitable for the bore of the bottle as have been described above, the first procedure begins with placing a desired drug, medicine, or medical reagent such as an antibiotic or vaccine in the bottle; thereafter, in a room which is kept at a low temperature, or after placing the bottle in a vessel which is held under the atmospheric pressure or a reduced atmospheric pressure, then applying a packing material having the aforesaid properties to the top surface of the bottle mouth in such a manner that said packing material covers the entire top peripheral surface and edge of the mouth of the bottle; then placing a cap member 2 onto said packing material deposited on the upper peripheral surface and edge of the mouth of the bottle; and thereafter applying a pressure onto the top-side of the cap member in such a way that the packing material which is disposed between the cap member 2 and the top peripheral surface of the bottle mouth 1 is subjected to a compression force of 2 kg/cm² or more. Whereupon, the packing material having the aforesaid properties will develop plastic flow and it flows into the fine irregularities which are present in the contact surfaces of both the top of the mouth 1 of the bottle and the under-side of the cap member. As a result, there is produced perfect adherence between the under-side of the cap member 2 and the upper-side of the packing material 3 and also between the under-side of the packing material 3 and the top surface of the mouth 1 of the bottle, so that the interior of the bottle is completely shut off from the external atmosphere.

In case the bottle is sealed in a room or a chamber or a vessel which is held at a reduced atmospheric pressure, it will be noted that after the sealed bottle is taken out into the atmosphere, the cap member 2 will be always pressed against the top peripheral surface of the mouth of the bottle by virtue of the atmospheric pressure which is applied thereto externally.

As has been described, according to the present invention, it is only necessary to apply a pressure to the cap member 2 against the top peripheral surface of the mouth of the bottle under either normal or reduced atmospheric pressure, said pressure being 2 kg/cm² or more. Accordingly, it is enough for the cap member to have a shape as is represented by a mere flat plate shown in the drawing which is an embodiment of the present invention. Besides, in view of the fact that the packing material 3 is of adhesiveness, it affords a superior adherence to the top surface and edge of the mouth and also to the underside of the cap member. Upon being subjected to a pressure which is applied externally thereof, the packing material 3 will develop plastic flow and intrude into the fine irregularities and cracks and undulations which are present in and on the top peripheral surface and edge of the mouth of the bottle and also in and on the under-side of the cap member and will fill them up during the flow of the packing material, ending in a perfect tight adherence thereto. Thus, the interior of the bottle is completely shut off from the external atmosphere. The adherence of the packing material to both the cap member and the mouth of the bottle is such that there will occur no detachment of the cap from the mouth of the bottle owing to the impact which is created when two or more bottles accidentally collide with each other in a reduced atmospheric pressure chamber. After the sealed bottle is taken out into the atmosphere, there is produced a perfect adherence between the top surface of the mouth of the bottle and the under-side of the packing material and also between the under-side of the cap member and the upper-side of the packing material, so that a perfect insulation of the external atmosphere is provided for the contents placed in the bottle. Since the packing material will not develop plastic deformation when subjected to a compression force of the order of 1 kg/cm², it never occurs that the packing material will flow out and disappear from the sealing area of the bottle mouth nor will there occur any appreciable deformation of the packing material at atmospheric pressure. Thus, the sealed bottle of the present invention is effective in preserving the contents against moisture and/or under a reduced pressure for an extended period of time. The packing material which is used in the present invention is of the properties which, above all, are characteristic in that it has adhesiveness at normal temperature and that it turns into complete plastic flow state when it is subjected to a compression force of about 2 kg/cm² or more. For this reason, the sealing which is effected by the use of this packing material affords the advantage that a perfect seal is obtained simultaneously upon being attached to the faces of articles under pressure.

Furthermore, the packing material per se is rich in the resistance to chemicals and in water-proofness, and therefore, it can be most effectively used in the preservation of medical preparations such as injection medicines in bottles.

The packing material which is suitable for use in working the method according to the present invention is an atactic polypropylene, an atactic polyethylene, their mixed compounds (which are, however, not mixed with those solvents which are employed, in general, in the preparation of adhesives) or a composition in which one of the aforesaid compounds is contained as the principal component part.

These atactic polypropylene and polyethylene materials which can be used in the present invention are selected from the group which are of the properties that they develop plastic flow when subjected to a compression force ranging from 2 to 10 $kg/cm^2$, that they exhibit an elongability in the range of from 200 to 400% and a considerable adhesiveness at normal temperature. These packing materials which can be employed in the present invention are not affected by chemicals, nor are they toxic because they do not contain any plasticizer or solvent, nor do they affect drugs and medicines.

It is to be noted that, in the present invention, the cap member can be covered laterally with an aluminum ring member 4, note FIG. 1, in order to protect the cap member from possible impact which is applied thereto externally. Such a modification of the cap member should be understood to lie well in the scope of the present invention. As a further modification of the cap member, it should be understood that the cap member can be of the screw-in type.

What is claimed is:

1. A seal for the opening in a bottle and like containers for protecting the contents from ambient moisture and/or preserving the contents under reduced pressure conditions, comprising a cap member for covering the opening in the container, a packing material disposed between the surface of the opening in the container and the cap member, said packing material being formed of a plastic material which exhibits adhesive characteristics at normal temperatures and which undergoes plastic flow when subjected to a compression force of about 2 $kg/cm^2$ and does not undergo plastic flow when subjected to a compression force of about 1 $kg/cm^2$, said plastic material consisting of at least one of atactic polypropylene, atactic polyethylene, the mixed components of atactic polypropylene and polyethylene without the solvents used in the preparation of adhesives and a composition in which at least one of atactic polypropylene and atactic polyethylene is the principal component part, said packing material being waterproof, resistant to chemicals, non-toxic and air tight, said packing material having a thickness of about 0.1 mm and having an elongability in the range of 200 to 400%, and said cap member is a flat metal plate.

2. A seal, as set forth in claim 1, wherein a ring-shaped member formed of aluminum extends about the circumferential periphery of said cap member and downwardly about the container from its open end for protecting said cap member and seal from possible impact.

3. A seal for the opening in a glass bottle and similar glass containers for protecting the contents from ambient moisture and/or preserving the content under reduced temperature conditions, comprising a flat disc-shaped metal cap member for completely covering the opening in the container so that it extends laterally outwardly from the opening, a disc-shaped packing material disposed between the said cap member and the surface of said container defining the opening therein for completely covering the opening in the container, said packing material being formed of a plastic material which exhibits adhesive characteristics at normal temperature and which undergoes plastic flow when subjected to a compression force of about 2 $kg/cm^2$ and does not undergo plastic flow when subjected to a compression force of below 2 $kg/cm^2$ so that the plastic flow of said packaging material fills any fine irregularities and undulations of said cap member and the surface of the container defining the opening to be closed, said plastic material consisting of at least one of atactic polypropylene, atactic polyethylene, the mixed components of atactic polypropylene and atactic polyethylene without the solvents used in the preparation of adhesives and a composition in which at least one of atactic polypropylene and atactic polyethylene is the principal component part, said packing material being waterproof, resistant to chemicals, non-toxic and air tight, said packing material having a thickness of about 0.1 mm and an elongability in the range of 200 to 400 % and a ring-shaped member formed of aluminum and extending laterally about the circumferential periphery of said cap member and downwardly about the container from its open end for protecting said cap member and seal from possible impact.

* * * * *

UNITED STATES PATENT OFFICE
CERTIFICATE OF CORRECTION

Patent No. 3,791,545          Dated February 12, 1974

Inventor(s) SHOZO NARUSAWA ET AL

It is certified that error appears in the above-identified patent and that said Letters Patent are hereby corrected as shown below:

In the heading of the patent, insert

--[30]     Foreign Application Priority Data

January 11, 1968   Japan.............sho 43-1102--

Inventor Iizuka's full name should read:

--Noritoshi Iizuka--.

Signed and sealed this 16th day of July 1974.

(SEAL)
Attest:

McCOY M. GIBSON, JR.            C. MARSHALL DANN
Attesting Officer               Commissioner of Patents